United States Patent Office 2,734,059
Patented Feb. 7, 1956

2,734,059

MELAMINE PURIFICATION

Richard W. Hamilton, Darien, and William C. Mallison, Noroton, Conn., assignors to American Cyanamid Company, New York, N. Y., a corporation of Maine No Drawing. Application November 26, 1954,
Serial No. 471,522

3 Claims. (Cl. 260—249.7)

This invention relates to the purification of melamine and more particularly it is concerned with the purification of melamine by physical means.

An outstanding problem in the production of melamine is the necessity for purification of the melamine-containing product obtained from a melamine-making apparatus. During melamine manufacture crude melamine is obtained by condensing vapors of melamine and chemically related compounds. The condensate contains melamine and occluded impurities such as ammeline, ammelide, melam, melon, and the like. These are quite similar in many physical and chemical properties to melamine itself. Accordingly, the separation of melamine therefrom by chemical or physical means has not always been simple or economically advantageous to accomplish.

Probably the most commonly-encountered method for the separation of pure melamine product from its impurities is the use of a caustic crystallization procedure. Impure melamine is dissolved in water containing caustic soda. In order that the melamine may be dissolved to a practical extent, the dissolving process is usually carried out at elevated temperature, often about 125° C.–150° C. Resultant hot caustic liquor containing insoluble impurities is then clarified, as by decantation or filtration, and clarified solution cooled to about room temperature. Under these conditions melamine can be crystallized as a substantially pure product.

Elevated temperatures are essential in this process, since melamine is difficultly soluble in water at room temperature. Even in water at 125° C. melamine is only soluble to the extent of about 11–12%. The amount of caustic required to keep dissolved impurities in solution during and after cooling varies with the grade of the crude melamine. If the latter contains 1% impurities or less, about 1% caustic will usually suffice. For a higher content of impurities, usually up to about 5%, a caustic solution of about 2% strength will be needed.

Despite the obvious advantages of the caustic crystallization purification process, it possesses certain limitations. The most serious of these is the fact that melamine itself is lost since some is converted to soluble impurities by the caustic solution; some will stay in solution even after the solution has been cooled to room temperature. Not the least of the limitations is the requisite use of elevated temperatures in order to operate at economical efficiency.

Crude or impure melamine mixtures which emanate from a continuous type of melamine reactor contain particles of two distinct size ranges. One is comprised of substantially pure melamine particles, usually of very small size, on the order of 0.5 micron. As noted above, these are produced from the vapors in the reactor. The other and larger particle size range may extend up to about one-half inch in diameter. They usually comprise "melamine-containing impurities" and are principally produced from the thermal decomposition of the vapors from the reactor.

While it would seem obvious to separate these two groups of differing particle size ranges by simple screening, unfortunately it is not possible to do so. Particles of intermediate size are present. Moreover, the small particles of high purity melamine agglomerate so quickly and effectively as to destroy the effectiveness of a screening operation. Additionally, since the density of the pure melamine particles is about 1.57 and the density of the large melamine-containing impurity particles is about 1.54, the gravity differential is too small and inconsequential to utilize methods of separation that depend principally upon standard gravity separations.

It is this unfortunate nature of the product mixture which has led the industry to employ the useful but not wholly satisfactory caustic crystallization method.

It is, therefore, the principal object of the present invention to provide a process of preparing high grade melamine that is not subject to the above-described shortcomings. This object has been achieved in a simple and effective manner.

In general, the process of the present invention comprises forming a slurry of crude melamine, subjecting the slurry to an operation which can be designated as hydraulic classification, separating the so-classified fraction of slurry containing purified melamine and collecting the latter.

Apparatus for successfully conducting the process of the invention is known. Apparatus such, for example, as the Evans, Calument or the Richards vortex classifiers either in the original or in some modified form will be used to accomplish the melamine purification. Although hydraulic classification operations usually employ water per se, such practice is not desirable in the purification of melamine. This is because at room temperature (25° C.), melamine is soluble in water to the extent of a little less than 0.5%. In order to prevent undue loss of melamine in the liquid menstruum, it is essential to use a saturated melamine solution as the liquid medium.

The preferred apparatus modification for separating the fine and substantially pure melamine particles from the larger or coarser melamine-containing impurities is the utilization of a cyclone. When the solids in a liquid medium slurry are sufficiently diluted and preferably to the extent of about 7–10% solids in saturated aqueous melamine solution, a very effective classification is obtained when the so-diluted mixture is subjected to separation in a cyclone. However, where the solids content of the slurry is in the range of about 1% to 15%, the cyclone operates quite well. On the other hand, low concentrations, on the order of less than 1% are inefficient due to the large volume of liquid that must be handled, while the higher concentrations on the order of more than 15% begin to give less satisfactory separation.

Most cyclones are operated by pumping in a slurry of solids in a suspending medium. In order to prevent the cyclone from clogging, it is preferred to initially screen the feed solids or the feed slurry in order to remove any large particles, usually the plus one quarter (¼) inch or more sizes.

The cyclone will discharge fines in the overflow and the coarse in the underflow. Conditions of flow in the cyclone are adjusted to yield desirable size fraction separation. Variable factors as the pressure of the feed slurry, the size of the vortex, the cone angle and the size of the apex have an effect on the operation and these may be adjusted in the cyclone separator to obtain the most efficient size separation.

Occasionally, it may be found economical to allow some of the impurities to overflow with the substantially pure melamine fines. The overflow fines may then be given a simple caustic wash to remove the small amount of impurities present. The impurities thus removed by the wash generally leave 99.8–100% pure melamine.

While the coarse and oversized particles obtained in the process of our invention may be discarded, it is an undesirable practice to do so, since it is generally uneconomical. Such particles contain a fairly large quantity of melamine along with ammeline, ammelide, melon, melam, urea and other similar impurities. These particles also contain entrapped gases such as ammonia. It is highly desirable, therefore, that the melamine in these coarse particles be recovered. As exemplary, the oversize may be collected from the cyclone and dried. Once dried, the oversize particles may be size-reduced in any suitable manner to about one micron or less. This comminuted material will then be subjected to the aforedescribed classification operation in order to separate substantially pure melamine therefrom.

The following examples are given by way of illustration of the practice of the present invention, but are not intended to be construed as being limited thereto.

*Example 1*

0.657 pound of crude melamine analyzing 85.6% melamine, 8.8% urea, and 5.6% impurities is slurried with 7.713 pounds of an aqueous saturated melamine solution containing 0.5% melamine to form a slurry containing 7.9% solids. This feed is pumped under a pressure of 30 pounds per square inch (p. s. i. g.) to the feed inlet in the side of a three inch cyclone. The conditions in the cyclone are as follows:

(a) Vortex size _____ inches__ 5/8
(b) Apex size _____ do____ 5/16
(c) Cone angle _____ 20°

The system reaches equilibrium in less than 5 seconds.

The overflow slurry containing fines weighs 7.436 pounds, of which 0.552 pound is solids (on a dry basis) and analyzing 97.2% melamine and 2.8% impurities. When these fines are washed with a hot 0.5% caustic solution and air dried, a melamine product of 99.9% purity is obtained.

*Example 2*

The underflow slurry containing coarse, oversized particles in the range of 1/4 to 1/2 inch in diameter of Example 1, weigh 0.105 pound on a dry basis. These comprise ammeline, ammelide, melon, melam, urea and other impurities. The dried oversized particles are then ball-milled to about 0.5 micron. They are then slurried with 1.286 pounds of an aqueous saturated melamine solution containing 0.5% melamine to form a slurry containing approximately 7.8% solids. This feed is pumped into the cyclone described in Example 1 and subjected to the foregoing classification operation.

The over-fines contain 0.088 lbs. of solids (on a dry basis) analyzing 96.8% melamine and 3.2% impurities. These over-fines are then washed with a hot 0.5% caustic alkali solution and dried. A melamine product of 99.5% purity is obtained which is then combined with the purified melamine product of Example 1.

*Example 3*

An 8.2% slurry of crude melamine in an aqueous saturated melamine solution containing 0.5% melamine is passed into the cyclone of Example 1 except that the apex size is one quarter (1/4) inch and the cone angle is 10°. The overflow fines analyze on a dry basis 97.7% melamine and 2.25% impurities.

After treatment with a warm caustic wash, the purity of the melamine product is 100.0%.

We claim:

1. The method for purifying crude melamine which comprises: forming a slurry of crude melamine in an aqueous saturated melamine solution, said slurry containing crude melamine in the range of from about 1% to about 15% solids, subjecting said slurry to a cyclone classification operation, separately collecting overflow fines containing essentially purified melamine and underflow coarse containing essentially impurities from said classification, subjecting said resultant overflow fines to an alkaline wash, air-drying and recovering pure melamine.

2. The method according to claim 1 wherein said slurry contains crude melamine in the range of about 7% to about 10% solids.

3. The method for purifying crude melamine which comprises: forming a slurry of crude melamine in an aqueous saturated melamine solution, said slurry containing crude melamine in the range from about 1% to about 15% solids, subjecting said slurry to a cyclone classification operation, separately collecting overflow fines containing essentially purified melamine and underflow coarse containing essentially impurities from said classification, grinding said collected underflow coarse particles, subjecting said coarse particles to a second cyclone classification operation, collecting overflow fines containing essentially purified melamine, subjecting said resultant overflow fines to alkaline wash, air-drying said alkaline-washed fines and recovering purified melamine.

References Cited in the file of this patent

UNITED STATES PATENTS

| | | |
|---|---|---|
| 2,341,180 | Jayne | Feb. 8, 1944 |
| 2,396,193 | Paden | Mar. 5, 1946 |
| 2,473,488 | Hughes | June 14, 1949 |
| 2,566,230 | Mackay | Aug. 28, 1951 |
| 2,647,119 | Hayworth | July 28, 1953 |